Patented Sept. 29, 1942

2,297,434

UNITED STATES PATENT OFFICE 2,297,434

DETOXICATION OF CASTOR POMACE

Willi Rudolph, Karlsruhe, Germany; vested in the Alien Property Custodian

No Drawing. Application January 22, 1940, Serial No. 315,039. In Germany February 10, 1939

2 Claims. (Cl. 99—2)

This invention relates to a process of treating castor pomace, and in particular to a process of preparing castor pomace or parts thereof for animal and/or human consumption.

The albuminous residue or pomace obtained at the extraction of oil from castor beans contains ricin and ricinine, which substances are poisonus and, therefore, prevent the use of untreated castor pomace as a foodstuff.

I am aware that it has heretofore been proposed to render ricin harmless by boiling and/or steaming the castor pomace. However, this method fails to remove the ricinine which remains in the pomace and, as a result thereof, castor pomace treated in the above mentioned manner and fed to animals has had a harmful effect by causing loss of appetite, constipation and emaciation. I have found out that it is the ricinine which, in the thus treated castor pomace, causes the said harmful effects.

I am also aware that it has been suggested to treat castor pomace with a highly diluted alkaline liquor at a low temperature and that, in this way, it has been possible to obtain a practically non-poisonous foodstuff. However, castor pomace treated in this known manner is relatively poor in albumen, the contents of albumen amounting to approximately only 12% to 15%, whereas the albumen in untreated castor pomace amounts to about 35%.

Accordingly, it is an object of the invention to provide a simple and economical process of rendering the albumen residue or pomace, obtained at the extraction of oil from castor beans, nontoxic without the necessity of applying alkaline liquor, which harmfully affects the food value of the treated residue.

It is a further object of the invention to provide a simple method of treating castor pomace which will make it possible not only to render the ricin harmless but also to extract the ricinine, while substantially maintaining the albumen originally present in the untreated castor pomace.

The problem underlying the present invention has been solved by grinding the albumen residue or pomace to be treated to a fine dust-like powder, repeatedly boiling this powder in an excess of fresh water for a short time, instantaneously withdrawing the liquid from said residue or pomace, thoroughly washing out the powder with hot water, and finally drying said powder.

In this way, the ricinine is completely extracted from the treated pomace so that the latter is rendered nontoxic and converted into a valuable material rich in albumen, since the albumen substances thereof have not passed into solution.

Extensive feeding tests with mice, rabbits and guinea pigs have shown that castor pomace treated according to the invention is free from poisonous effects and instead of causing harm like loss of appetite, constipation and emaciation, promotes growth.

The following mode of procedure which yields satisfactory results is given by way of example:

Example 10 kg. castor pomace are ground in a ball mill to a dust-like powder and then boiled in 30 liters of water for about 10 minutes. The thin liquid paste thus formed is thereupon withdrawn in hot condition by suction through a porcelain filter, whereupon the thus separated liquid which contains the ricinine is discarded. The well dried residue is boiled again in 30 liters of fresh water for 10 minutes and then withdrawn in hot condition as before. For the third time the residue is boiled in 30 liters of fresh water for 10 minutes, whereupon the liquid is withdrawn in hot condition by suction. The thoroughly pressed product is finally dried in a vacuum at 70° to 80° C.

It will be understood that I desire to comprehend within my invention such modifications as come within the scope of the claims and the invention.

I claim:

1. A process of rendering non-toxic the albumen residue or pomace obtained at the extraction of oil from castor beans, which comprises the steps of (a) grinding the residue or pomace to be treated to a fine dust-like powder, (b) boiling said powder in an excess of fresh water for a short time to render the ricin harmless in said powdered pomace, (c) and extracting the ricinine by instantaneously withdrawing the liquid in hot condition from the thus obtained mixture by suction through a porcelain filter, (d) discarding the withdrawn liquid, (e) repeating the steps (b), (c) and (d) at least a second time, and (f) thoroughly washing out the thus treated powder with hot water; and then (g) drying the thus obtained powder.

2. A process of rendering non-toxic the albumen residue or pomace obtained at the extraction of oil from castor beans, which comprises the steps of (a) grinding the residue to be treated to a fine dust-like powder, (b) boiling the said powder in an excess of fresh water for a short time to render the ricin harmless in said powdered pomace, (c) and extracting the ricinin by instantaneously separating by suction the liquid in said pomace from the remainder thereof, (d) discarding the thus separated liquid, (e) repeating at least a second time the steps of (b), (c) and (d), and (f) thoroughly washing out the powder by means of hot water; and then (g) drying the thus treated powder in a vacuum at 70° to 80° C.

WILLI RUDOLPH.